US012656535B1

(12) United States Patent
Zafiriou et al.

(10) Patent No.: US 12,656,535 B1
(45) Date of Patent: Jun. 16, 2026

(54) IMPACT RESISTANT WIDE ANGLE CAMERA

(71) Applicant: Amazon Technologies, Inc., Seattle, WA (US)

(72) Inventors: Konstantinos Zafiriou, Somerville, MA (US); Liancai Zeng, Zhuhai (CN); Sridharan Thirumalai Vasu, Framingham, MA (US); Tomer Anor, Sudbury, MA (US)

(73) Assignee: Amazon Technologies Inc., Seattle, WA (US)

( * ) Notice: Subject to any disclaimer, the term of this patent is extended or adjusted under 35 U.S.C. 154(b) by 306 days.

(21) Appl. No.: 18/374,277

(22) Filed: Sep. 28, 2023

(51) Int. Cl.
*G02B 1/14* (2015.01)
*G02B 7/02* (2021.01)

(52) U.S. Cl.
CPC .............. *G02B 1/14* (2015.01); *G02B 7/021* (2013.01)

(58) Field of Classification Search
CPC .......... G02B 7/02; G02B 7/021; G02B 7/022; G02B 7/023; G02B 7/025; G02B 7/026
See application file for complete search history.

(56) References Cited

U.S. PATENT DOCUMENTS

| | | | | |
|---|---|---|---|---|
| 4,342,863 A | * | 8/1982 | Hohokabe | ................ G02C 7/02 |
| | | | | 528/360 |
| 4,608,349 A | * | 8/1986 | Kerko | ...................... C03C 3/093 |
| | | | | 501/59 |
| 2015/0093103 A1 | * | 4/2015 | Umehara | ............. G03B 11/043 |
| | | | | 396/448 |
| 2020/0310083 A1 | * | 10/2020 | Kim | ................... G02B 13/0045 |
| 2021/0191077 A1 | * | 6/2021 | Chia | .................. G02B 13/0045 |
| 2022/0357546 A1 | * | 11/2022 | Palve | ..................... G02B 7/021 |

FOREIGN PATENT DOCUMENTS

| | | | | | |
|---|---|---|---|---|---|
| CN | 109140407 A | * | 1/2019 | ........... F21V 31/005 |
| KR | 20100068223 A | * | 6/2010 | ............. G02B 7/023 |

\* cited by examiner

*Primary Examiner* — Ephrem Z Mebrahtu
(74) *Attorney, Agent, or Firm* — Kilpatrick Townsend & Stockton LLP

(57) ABSTRACT

Impact resistant wide angle cameras employ an impact resistant fisheye lens. An impact resistant wide angle camera includes an optical lens assembly, an enclosure, a lens stack housing, and an image sensor. The optical lens assembly includes a dome lens, a dome lens retainer, and a lens stack assembly. The dome lens is made from an impact resistant material selected to provide a minimum impact resistance drop test rating of at least IK6. The optical lens assembly is configured to provide a wide angle view covering at least 120 degrees. The enclosure includes a dome lens retainer mounting opening to which the dome lens retainer is directly or indirectly mounted. The image sensor is coupled with the lens stack housing and configured to generate image sensor output covering the wide angle view.

18 Claims, 4 Drawing Sheets

IMPACT RESISTANT WIDE ANGLE CAMERA

BACKGROUND

A wide angle camera (e.g., 64 to 200 degree field of view) can be employed in any suitable application. A wide angle camera typically employs a "fisheye" lens, which protrudes distally to enable imaging of objects over a wider field of view.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

For wide angle cameras that employ a fisheye lens, the wider the field of view, the more the fisheye lens protrudes distally. The more the fisheye lens protrudes distally, the more the susceptible the fisheye lens is to contact induced damage. Existing approaches for reducing the risk of damage to the fisheye lens include providing: 1) protruding enclosure features, 2) compliant mounting, and/or 3) a protective cover. These existing approaches, however, have some associated disadvantages. For example, protruding enclosure features may reduce the usable field of view. Compliant mounting may make it challenging to effectively seal the wide angle camera against water ingression. A protective cover may comprise optical performance. Each of these existing approaches may significantly increase the cost of the wide angle camera.

Figure 1:
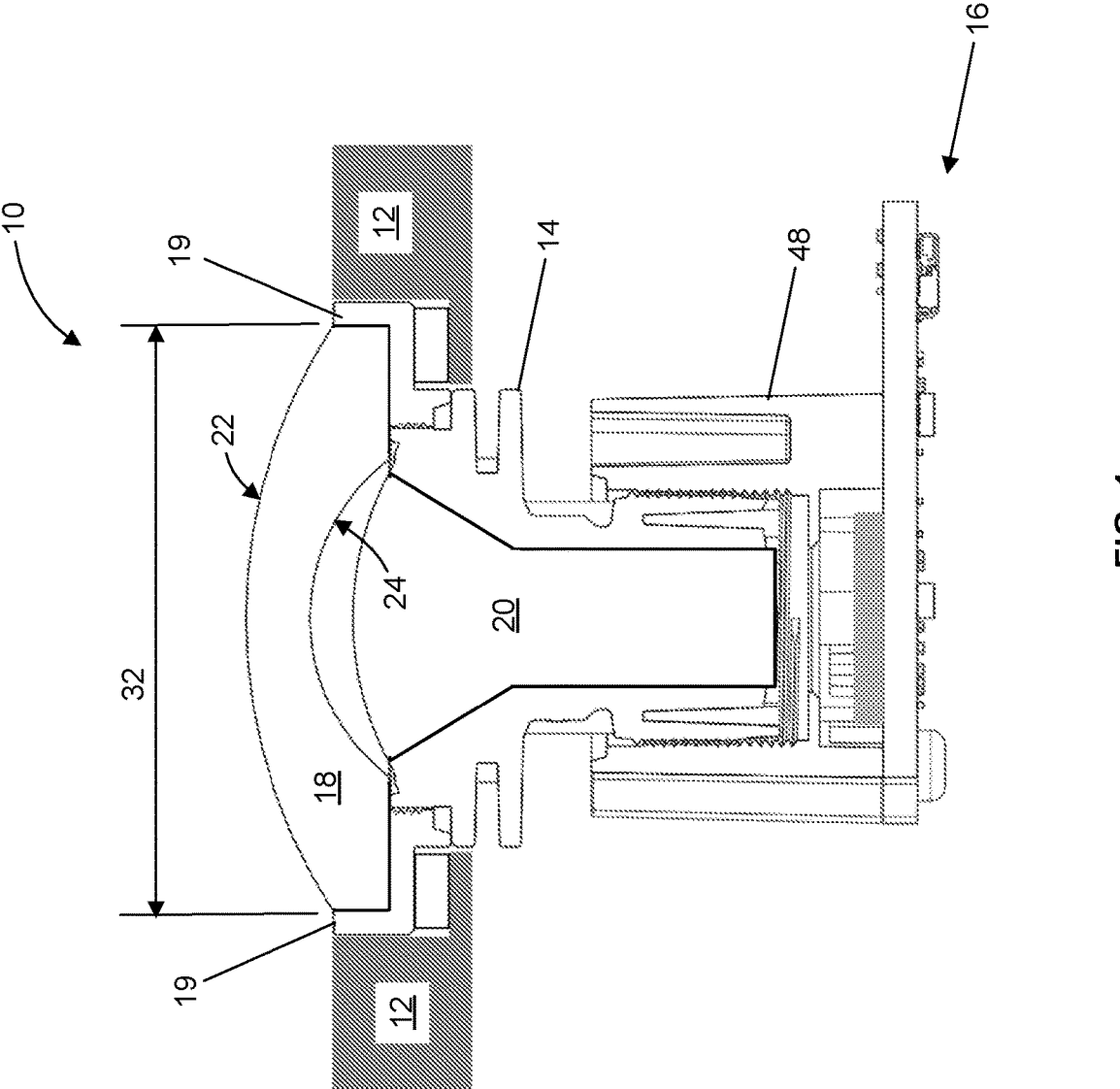
FIG. 1 shows a cross-sectional view of an impact resistant wide angle camera mounted to an enclosure via a dome lens retainer of the camera, in accordance with embodiments.

Turning now to the drawing figures in which similar reference identifiers refer to similar elements, FIG. 1 shows a cross-sectional view of an impact resistant wide angle camera 10, in accordance with embodiments. The camera 10 includes an optical lens assembly, an enclosure 12, a lens stack housing 14, and an image sensor assembly 16. The optical lens assembly includes a dome lens 18, a dome lens retainer 19, and a lens stack assembly 20. The dome lens 18 is mounted and bonded to the dome lens retainer 19 using a suitable adhesive (e.g., a suitable epoxy). The dome lens retainer 19 can be made from any suitable material (e.g., a suitable plastic, a suitable metal). The dome lens 18 includes a convex exterior surface 22 and a concave interior surface 24. The dome lens 18 provides a suitable non-zero negative optical power for achieving a wide angle view. In many embodiments, the dome lens 18 is made from an impact resistant material selected to provide a minimum impact resistance drop test rating of at least IK6 or higher (e.g., IK7 or IK8). For example, in some embodiments, the dome lens 18 can be made from Loricaem glass from CDGM Glass Company, LTD. In some embodiments, the dome lens 18 can be made from H-K9L tempered glass from CDGM Glass Company, LTD. The optical lens assembly is configured to provide the wide angle view (e.g., covering at least 120 degrees, at least 130 degrees, at least 140 degrees, at least 150 degrees, at least 160 degrees, at least 170 degrees, at least 180 degrees up to 200 degrees). The enclosure 12 includes a dome lens mounting opening 26 (shown in FIG. 2) defined by dome lens mounting surfaces to which the dome lens retainer 19 is mounted so that an impact force applied to the dome lens 18 is transferred to the enclosure 12 through the dome lens retainer 19 and the dome lens mounting surfaces. The lens stack assembly 20 is mounted to the lens stack housing 14. In many embodiments, the lens stack housing 14 is mounted to the dome lens retainer 19. The image sensor assembly 16 is coupled with the lens stack housing 14 and configured to generate image sensor output covering the wide angle view. In many embodiments, the dome lens 18 is configured to provide a suitable negative optical power (e.g., at least −50 diopter, an effective front focal length in a range from −20 mm to −40 mm) suitable for providing the wide angle view to the camera 10.

The dome lens 18 can have any suitable impact resistant configuration. For example, the dome lens 18 can be made from tempered glass. As another example, the dome lens 18 can include a surface compression layer formed via chemical strengthening. The dome lens 18 can be configured to provide any suitable level of impact resistance (e.g., a minimum impact resistance drop test rating of at least IK6, IK7, or IK8). In many embodiments, the dome lens 18 has a minimum thickness 28 (e.g., in a range from 2 mm to 6 mm at the optical axis 30 of the dome lens 18) selected to provide a suitable impact resistance.

In many embodiments, the distal exposed surface 22 of the dome lens 18 protrudes distally substantially relative to a diameter 32 of the distal exposed surface 22. For example, the distal exposed surface 22 of the dome lens 18 can protrudes at least 3.5 mm for an external diameter 32 of about 30 mm.

The dome lens 18 can optionally include any suitable external scratch resistant coating. For example, the dome lens can include a scratch resistant coating that provides at least 6H hardness pencil test scratch resistance.

Figure 2:
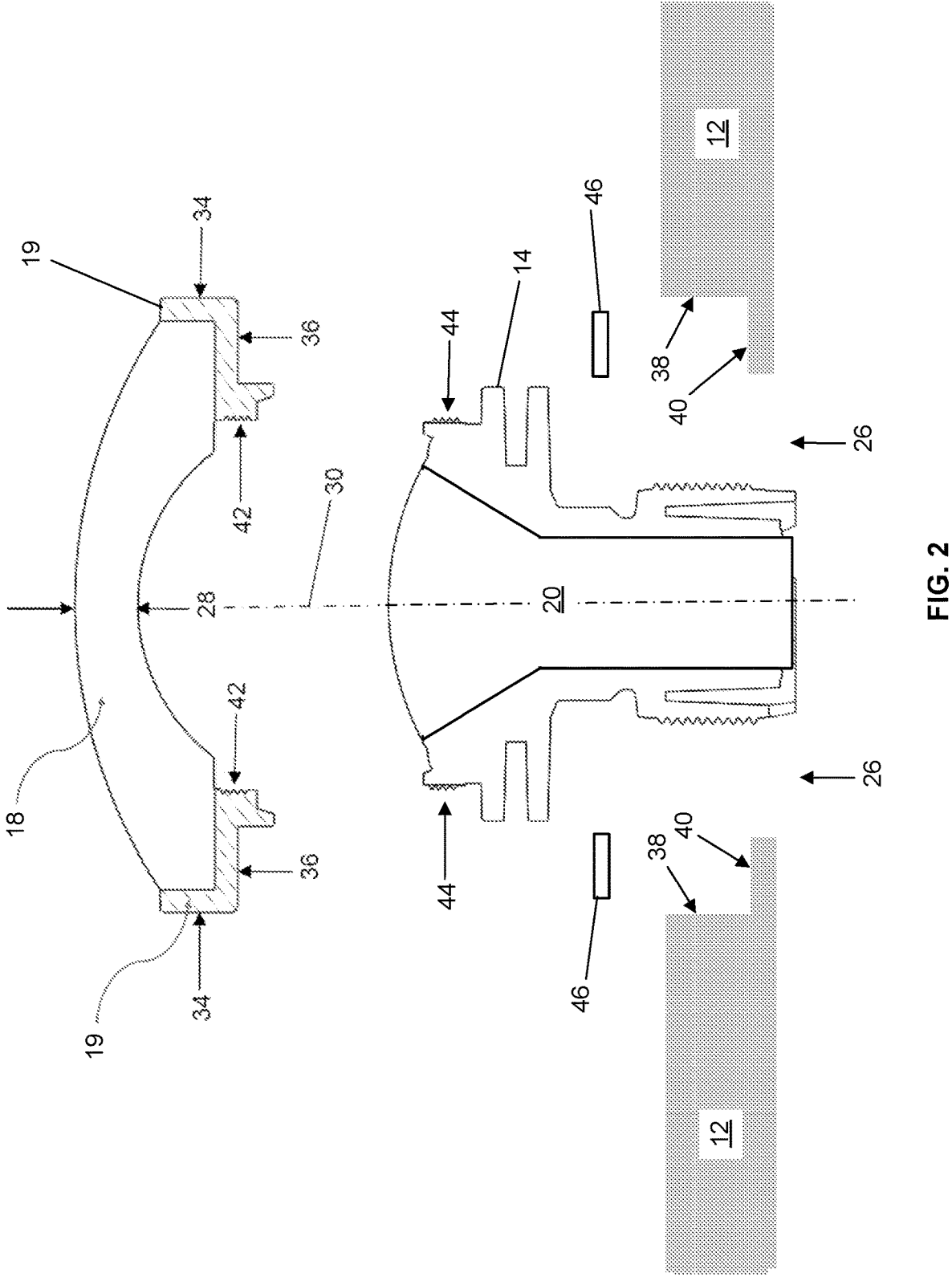
FIG. 2 shows an exploded cross-sectional view of a first installation subassembly of the camera of FIG. 1 and the enclosure.
Figure 3:
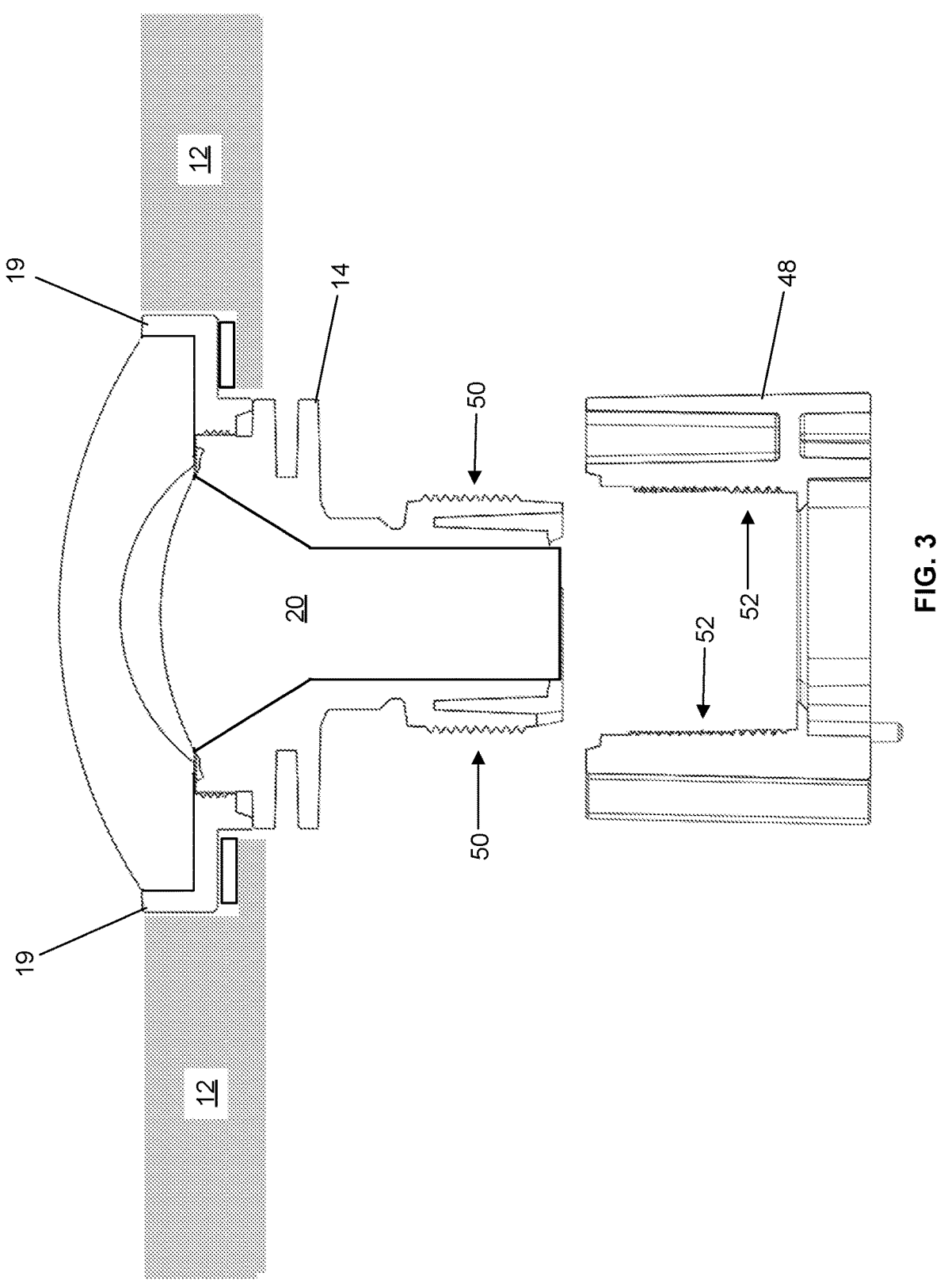
FIG. 3 shows an exploded cross-sectional view of a second installation subassembly of the camera of FIG. 1 with the first installation subassembly of FIG. 2 mounted to the enclosure.

In many embodiments, the enclosure 12 and the dome lens retainer 19 are configured with complementary shaped features for mounting of the dome lens retainer 19 to the enclosure 12. FIG. 2 shows an exploded cross-sectional view of a first installation subassembly of the camera 10 and the enclosure 12. In the illustrated embodiment, the dome lens retainer 19 includes a dome lens retainer outwardly facing radial retention surface 34 and a dome lens retainer proximally facing outer axial support surface 36. The enclosure 12 includes an enclosure inwardly facing radial retention flange 38 and an enclosure distally facing axial support surface 40. In the mounted configuration of the dome lens retainer 19 to the enclosure 12 (e.g., as shown in FIG. 3), the enclosure inwardly facing radial retention flange 38 extends around the dome lens retainer outwardly facing radial retention surface 34 to restrain the dome lens retainer 19 against radial movement relative to the optical axis 30. The enclosure distally facing axial support surface 40 is configured to block proximal axial movement of the dome lens retainer proximally facing outer axial support surface 36 during application of a proximally directed axial impact force on the dome lens 18.

In many embodiments, the lens stack housing 14 is mounted to the dome lens retainer 19, thereby supporting the lens stack housing 14 by the enclosure 12 via the dome lens retainer 19. The lens stack housing 14 can be mounted to the dome lens retainer 19 using any suitable approach. For example, as shown in FIG. 2, the dome lens retainer 19 can include a female threaded interface 42 and the lens stack housing 14 can include a male threaded interface 44 configured to be threaded into the female threaded interface 42 to attach the lens stack housing 14 to the dome lens retainer 19. Optionally, the dome lens retainer 19 and the lens stack housing 14 can be configured with complementary shaped features for mounting of the lens stack housing 14 to the dome lens retainer 19. For example, the dome lens retainer 19 can include a dome lens retainer inwardly facing radial retention surface and a dome lens retainer proximally facing inner axial support surface. The lens stack housing 14 can include a lens stack housing radial retention surface and a lens stack housing axial support surface. With the lens stack housing 14 attached to the dome lens retainer 19, the dome lens retainer inwardly facing radial retention flange can extend around the lens stack housing radial retention surface to restrain the lens stack housing 14 against radial movement relative to the optical axis 30. The dome lens retainer proximally facing inner axial support surface can be configured to block distal axial movement of the lens stack housing axial support surface. In the illustrated embodiment, the camera 10 includes a resilient annular sealing gasket 46 disposed between the surfaces 36, 38.

Figure 4:
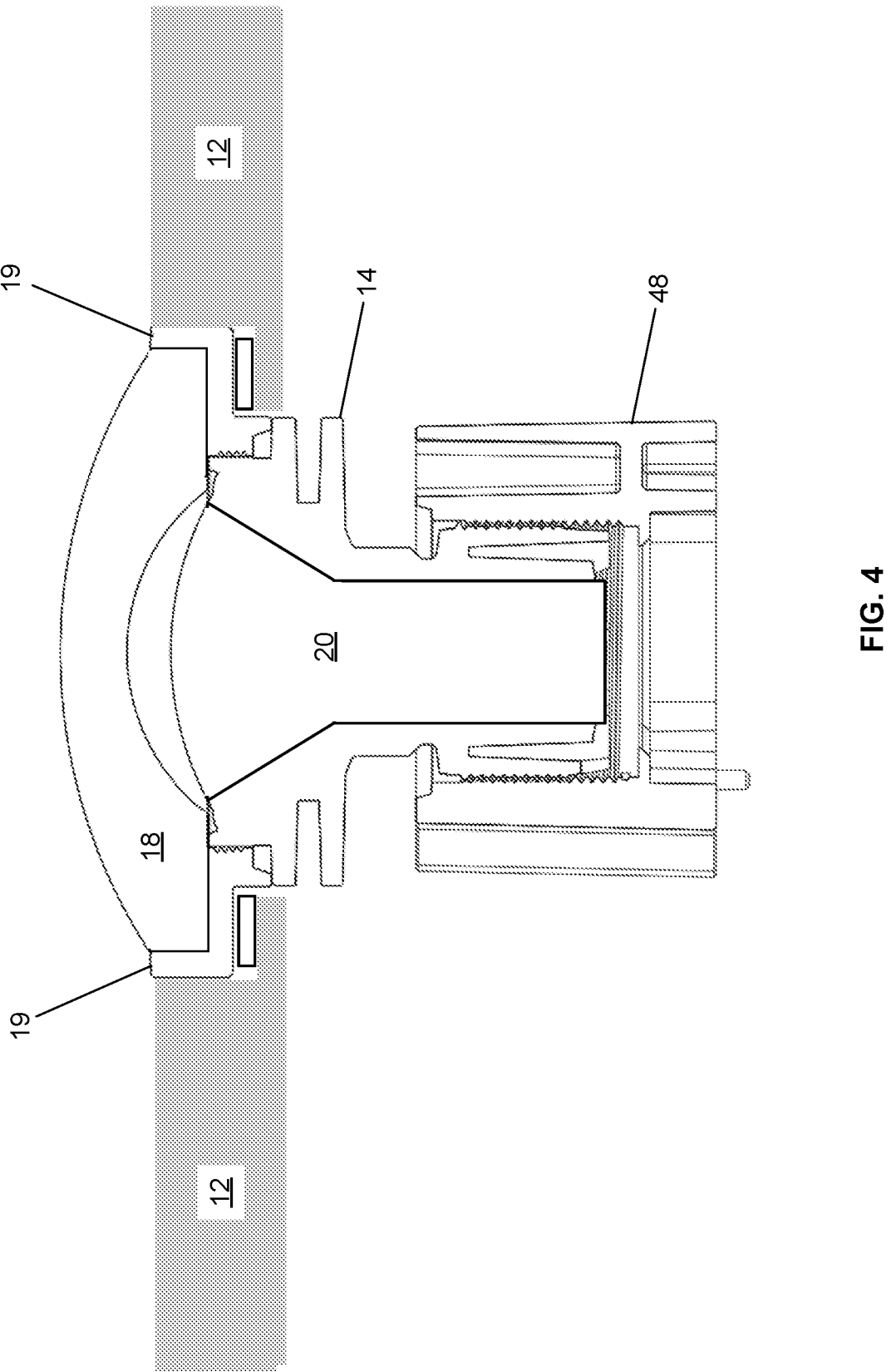
FIG. 4 shows a cross-sectional view of the second installation subassembly of the camera of FIG. 3 mounted to the enclosure.

FIG. 3 shows an exploded cross-sectional view of a second installation subassembly of the camera 10 with the first installation subassembly of FIG. 2 mounted to the enclosure 12. FIG. 4 shows a cross-sectional view of the second installation subassembly of FIG. 3 mounted to the enclosure 12. The camera 10 includes an image sensor housing 48 to which the image sensor assembly 16 is mounted. The image sensor housing 48 and the lens stack housing 14 can be configured with complementarily shaped coupling features for attaching the image sensor housing 48 to the lens stack housing 14. For example, in the illustrated embodiment, the lens stack housing 14 includes male threads 50 and the image sensor housing 48 includes female threads 52 configured for threaded engagement by the male threads 48 as shown in FIG. 4. Optionally, the image sensor housing 48 can be mounted to the enclosure 12. For example, the image sensor housing 48 and the enclosure 12 can be configured with complementarily shaped coupling features for coupling of the image sensor housing 48 and the enclosure 12. In many embodiments, the image sensor housing 48 includes suitable mounting features (e.g., threaded fastener holes) for mounting of the image sensor assembly 16 to the image sensor housing.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An impact resistant wide angle camera comprising:
an optical lens assembly comprising a dome lens, a dome lens retainer, and a lens stack assembly, wherein the dome lens has a convex exterior surface and a concave interior surface, wherein the dome lens has an effective front focal length in a range from −20 mm to 40 mm, wherein the dome lens is made from an impact resistant material selected to provide a minimum impact resistance drop test rating of at least IK8, wherein the optical lens assembly defines an optical axis, wherein the dome lens retainer comprises a dome lens retainer outwardly facing radial retention surface and a dome lens retainer proximally facing outer axial support surface, and wherein the dome lens and the lens stack assembly combine to provide a wide angle view covering at least 150 degrees;

an enclosure comprising a dome lens retainer mounting opening defined by one or more dome lens retainer mounting surfaces to which the dome lens retainer is directly or indirectly mounted so that an impact force applied to the dome lens is transferred to the enclosure through the dome lens retainer and the one or more dome lens retainer mounting surfaces, wherein the enclosure comprises an enclosure inwardly facing radial retention flange and an enclosure distally facing axial support surface, wherein the enclosure inwardly facing radial retention flange extends around the dome lens retainer outwardly facing radial retention surface to restrain the dome lens retainer against radial movement relative to the optical axis, and wherein the enclosure distally facing axial support surface is configured to block proximal axial movement of the dome lens retainer proximally facing outer axial support surface during application of a proximally directed axial impact force on the dome lens;

a lens stack housing to which the lens stack assembly is mounted, wherein the lens stack housing is directly or indirectly mounted to one or more lens stack housing mounting surfaces of the dome lens retainer; and an image sensor coupled with the lens stack housing and configured to generate image sensor output.

2. The camera of claim 1, wherein the dome lens comprises a surface compression layer formed via chemical strengthening.

3. The camera of claim 1, wherein an exposed external optical surface of the dome lens protrudes distally by at least 3.5 mm.

4. The camera of claim 1, wherein the dome lens comprises an external scratch resistant coating providing at least 6H hardness pencil test scratch resistance.

5. The camera of claim 1, wherein:

the dome lens retainer comprises a dome lens retainer inwardly facing radial retention surface and a dome lens retainer proximally facing inner axial support surface;

the lens stack housing comprises a lens stack housing radial retention surface and a lens stack housing axial support surface;

the dome lens retainer inwardly facing radial retention flange extends around the lens stack housing radial retention surface to restrain the lens stack housing against radial movement relative to the optical axis; and the dome lens retainer proximally facing inner axial support surface is configured to block distal axial movement of the lens stack housing axial support surface.

6. An impact resistant wide angle camera comprising:

an optical lens assembly comprising a dome lens, a dome lens retainer, and a lens stack assembly, wherein the dome lens has a convex exterior surface and a concave interior surface, wherein the dome lens provide a non-zero negative optical power, wherein the dome lens is made from an impact resistant material selected to provide a minimum impact resistance drop test rating of at least IK6, wherein the optical lens assembly defines an optical axis, wherein the dome lens retainer comprises a dome lens retainer outwardly facing radial retention surface and a dome lens retainer proximally facing outer axial support surface, and wherein the optical lens assembly is configured to provide a wide angle view covering at least 120 degrees;

an enclosure comprising a dome lens retainer mounting opening defined by one or more dome lens retainer mounting surfaces to which the dome lens retainer is directly or indirectly mounted so that an impact force applied to the dome lens is transferred to the enclosure through the dome lens retainer and the one or more dome lens retainer mounting surfaces, wherein the enclosure comprises an enclosure inwardly facing radial retention flange and an enclosure distally facing axial support surface, wherein the enclosure inwardly facing radial retention flange extends around the dome lens retainer outwardly facing radial retention surface to restrain the dome lens retainer against radial movement relative to the optical axis, and wherein the enclosure distally facing axial support surface is configured to block proximal axial movement of the dome lens retainer proximally facing outer axial support surface during application of a proximally directed axial impact force on the dome lens;

a lens stack housing to which the lens stack assembly is mounted, wherein the lens stack housing is directly or indirectly mounted to one or more lens stack housing mounting surfaces of the dome lens retainer; and an image sensor coupled with the lens stack housing and configured to generate image sensor output.

7. The camera of claim 6, wherein the dome lens comprises tempered glass.

8. The camera of claim 6, wherein the dome lens comprises a surface compression layer formed via chemical strengthening.

9. The camera of claim 6, wherein an exposed external optical surface of the dome lens protrudes distally by at least 3.5 mm.

10. The camera of claim 6, wherein the dome lens comprises an external scratch resistant coating providing at least 6H hardness pencil test scratch resistance.

11. The camera of claim 6, wherein the dome lens is made from an impact resistant material selected to provide a minimum impact resistance drop test rating of at least IK8.

12. The camera of claim 6, wherein:

the dome lens retainer comprises a dome lens retainer inwardly facing radial retention surface and a dome lens retainer proximally facing inner axial support surface;

the lens stack housing comprises a lens stack housing radial retention surface and a lens stack housing axial support surface;

the dome lens retainer inwardly facing radial retention flange extends around the lens stack housing radial retention surface to restrain the lens stack housing against radial movement relative to the optical axis; and the dome lens retainer proximally facing inner axial support surface is configured to block distal axial movement of the lens stack housing axial support surface.

13. The camera of claim 12, further comprising an image sensor housing to which the image sensor is mounted, wherein the image sensor housing and the lens stack housing are configured with complementarily shaped coupling features for coupling of the image sensor housing and the lens stack housing.

14. The camera of claim 6, further comprising an image sensor housing to which the image sensor is mounted, wherein the image sensor housing and the enclosure are configured with complementarily shaped coupling features for coupling of the image sensor housing and the enclosure.

15. The camera of claim 6, wherein the optical lens assembly is configured to provide a wide angle view covering at least 160 degrees.

16. The camera of claim 6, wherein:

the dome lens retainer comprises dome lens retainer female threads; and the lens stack housing comprises lens stack housing male threads configured to be threaded into the dome lens retainer female threads to attach the lens stack housing to the dome lens retainer.

17. The camera of claim 6, wherein the dome lens provide a negative optical power of at least 50 diopter.

18. The camera of claim 6, wherein:

the dome lens has a dome lens optical axis; and the dome lens has a minimum thickness in a range from 2 mm to 6 mm at the dome lens optical axis.

* * * * *